United States Patent [19]

Tani et al.

[11] 4,204,591
[45] May 27, 1980

[54] CONTROL MEANS FOR HYDRAULIC CLUTCHES

[75] Inventors: Mitsuhiro Tani; Hideo Watanabe, both of Matsuyama, Japan

[73] Assignee: Iseki Agricultural Machinery Mfg. Co., Ltd., Matsuyama, Japan

[21] Appl. No.: 912,066

[22] Filed: Jun. 2, 1978

[30] Foreign Application Priority Data

Jun. 9, 1977 [JP] Japan ................................ 52-75351[U]

[51] Int. Cl.² ............................................ F16D 19/00
[52] U.S. Cl. ..................................... 192/99 R; 74/520

[58] Field of Search ............ 192/85 R, 85 AA, 87.13, 192/87.18, 87.19, 99 S; 74/520, 100 R; 251/75

[56] References Cited

U.S. PATENT DOCUMENTS 1,691,673  11/1928  Rohe et al. ............................ 251/75

Primary Examiner—Ronald Feldbaum
Attorney, Agent, or Firm—Arthur T. Fattibene

[57] ABSTRACT

Control means for hydraulic clutches having a lever system whereby a toggle spring is connected between two levers mounted on the center of spool of a change over valve.

6 Claims, 3 Drawing Figures

CONTROL MEANS FOR HYDRAULIC CLUTCHES

BACKGROUND OF THE INVENTION

1. Field of the Invention

The present invention relates to a control means for hydraulic clutches and, more particularly, to a control means for a change-over valve for hydraulic clutches through which a pressurized oil is supplied into a hydraulic clutch whereby a rotary driving force from the engine is connected to or disconnected from a PTO drive shaft of, for example, a tractor.

2. Description of the Prior Art

A conventional hydraulic clutch of this kind is generally provided with a rotary spool type or slide spool type change-over valve to which a control handle is connected via a lever. The hydraulic clutch is let in and out while opening and closing an oil passage in the change-over valve by operating the control handle to rotate or slide the spool. When the control handle is slowly operated, the spool is rotated or slid slowly. In this case, the clutch is in a half-operated state for an unduly long time. This causes the lining of the clutch to be worn early or causes inconveniences due to the unnecessary heat generated. Especially, a clutch having a paper lining which has a low resistance to heat is easily damaged.

SUMMARY OF THE INVENTION

An object of the present invention is to eliminate the above-mentioned drawbacks encountered in the prior art control means for clutches.

Another object of the present invention is to provide a control means for hydraulic clutches which permits rotating or sliding the spool of the change-over valve at an optimum speed constantly irrespective of the operation speed of the control handle to shorten the time during which the clutch is in a half-operated state and prevent an early wear on the lining and generation of unnecessary heat.

To these ends, according to the invention, there is provided a control means for hydraulic clutches, which comprises a change-over mechanism consisting of a control lever; a shift lever rotatably connected to the fulcrum of the control lever; and a toggle spring whereby the control lever and shift lever are connected to each other, which is moved to right and left with respect to the fulcum of the control lever, and a change-over valve actuated by the shift lever of the change-over mechanism.

The above and other objects as well as advantageous features of the invention will become clear from the following description of the preferred embodiments taken in conjunction with the accompanying drawings.

DESCRIPTION OF THE PREFERRED EMBODIMENTS

Figures 1, 2, 3:
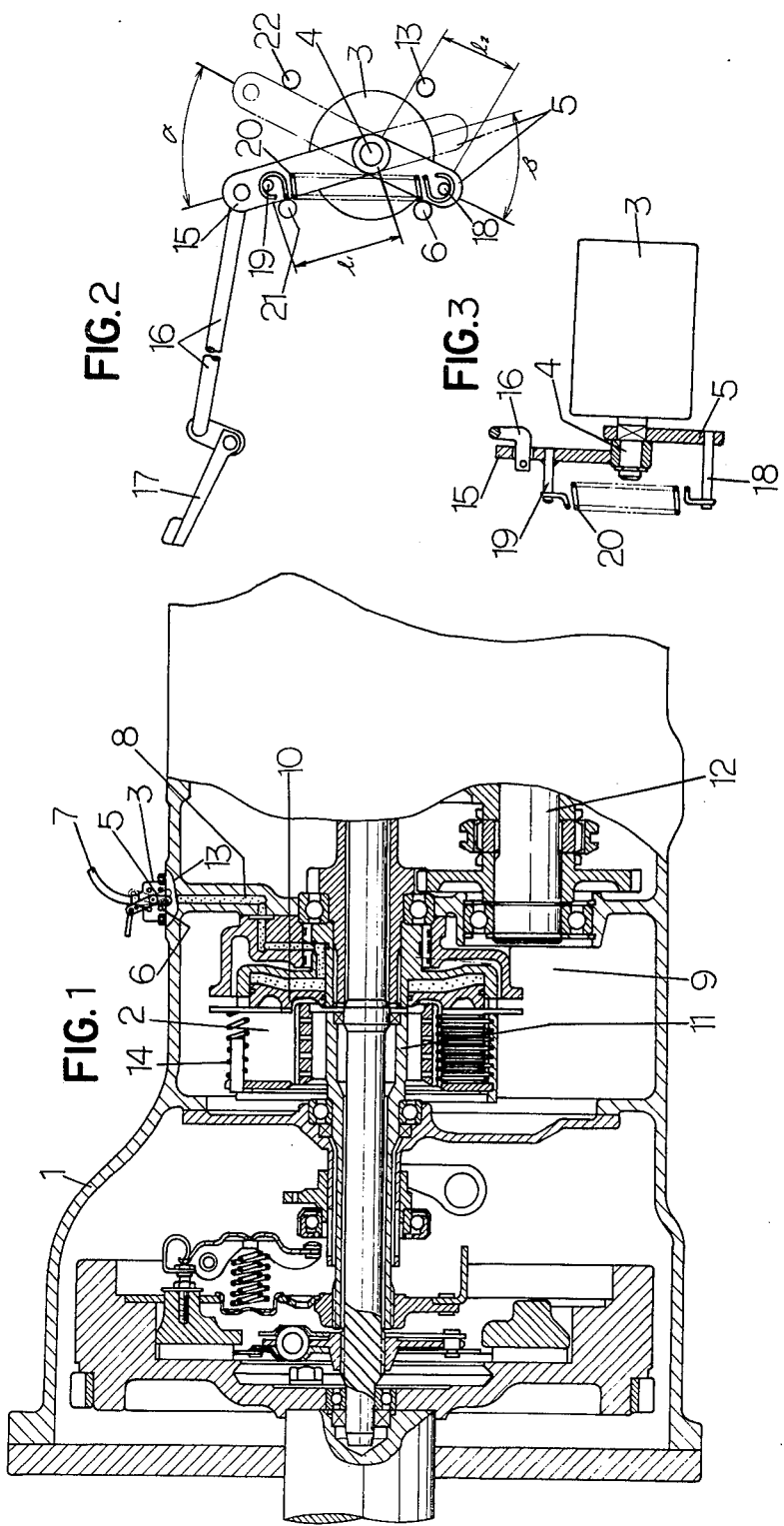
FIG. 1 is a side elevational view in cross section of a principal portion of a hydraulic clutch to which a control means according to the present invention is applied.
FIG. 2 is a side elevational view of an embodiment of the present invention.
FIG. 3 is a front elevational view of the embodiment as shown in FIG. 2.

The construction of the present invention will be described in detail with reference to the accompanying drawings.

Referring to FIG. 1, reference numeral 1 denotes a transmission case for a tractor; 2 a multiple disc clutch provided in the transmission case 1; 3 a rotary change-over valve provided on the outer surface of the transmission case 1; 4 a spool or valve member; and 5 a valve lever mounted on the spool or valve member 4. When the valve lever 5 is engaged with a stopper 6 or when the valve lever 5 is moved to a position as shown in a solid line in FIG. 1, where the clutch is let in, a pressurized oil introduced into the change-over valve 3 through a pipe 7 flows through an oil passage 8 to forwardly move a piston 10 fitted in a clutch cylinder 9, so that the rotary driving force of a clutch shaft 11 is transmitted from the clutch cylinder 9 to a PTO drive shaft 12. When the valve lever 5 is engaged with a stopper 13 or when the valve lever 5 is moved to a position as shown in a broken line in FIG. 2, where the clutch is let out, the change-over valve 3 is so operated as to stop the flow of the pressurized oil into the passage 8 so that the rotary drive force of the hydraulic clutch 2 is stopped due to the resilient force of a spring 14.

The control means according to the present invention for such a hydraulic clutch 2 is constructed as shown in FIGS. 2 and 3.

Referring to FIGS. 2 and 3, a valve lever 5 and a shift lever 15 are rotatably mounted on a spool 4 of a change-over valve 3. The shift lever 15 is connected to a control handle 17 via a link mechanism 16. The valve lever 5 and shift lever 15 mounted on the spool 4 are provided with anchor means, e.g. support pins 18, 19, respectively, to which both ends of a toggle spring 20 are fastened to thereby connect these levers 5, 15 to each other. Outside the outer end portions of the levers 5, 15, stoppers 6, 13, 21, 22 are provided. The effective length $l_1$ of the shift lever 15 is longer than that $l_2$ of the valve lever 5.

When the valve lever 5 is moved to a position as shown in a broken line in FIG. 2 where the valve lever 5 is out of operation, the shift lever 15 and valve lever 5 are limited by the right-hand stoppers 13, 22, respectively, with the support pins 19, 18 positioned on the right of the spool 4. At this time, the levers 15, 5 are in the shape of a dogleg. When the control handle 17 is then rotated counter-clockwise, the shift lever 15 is rotated in the same direction via the link mechanism 16. When an imaginary straight line passing the axes of the support pins 18, 19 is on the right of the center of the spool 4 during the rotation of the shift lever 15, the valve lever 5 is urged in the counter-clockwise direction by the toggle spring 20 to prevent the valve lever 5 from being moved. However, when the above-mentioned imaginary line, i.e. the axis line of the toggle spring 20 has passed to any extent the center of the spool 4 the valve lever 5 is urged in the clockwise direction by the toggle spring 20. As a result, the lever 5 is rotated clockwise so as to be engaged with the left-hand stopper 6, while the shift lever 15 reaches the end of its stroke or is engaged with the stopper 21. Namely, the levers 5, 15 are at this time in positions as shown in solid lines in FIG. 2.

In short, the change-over valve 3 is opened and closed while the spool 4 is rotated in accordance with the rotary movement of the valve lever 5. During the operation of the change-over valve 3, a back pressure of the pressurized oil is exerted on the piston 10 of the hydraulic clutch 2 as shown in FIG. 1 so as to let in the same.

When the control handle 17 is rotated clockwise with the hydraulic clutch 2 let in, the letting-out operation therefor is carried out in substantially the same manner as in the above case except that the shift lever 15 and valve lever 5 are rotated in the direction opposite to that in which they are rotated in the above case. The operation for letting out the hydraulic clutch 2 is carried out by the action of the change-over valve 3 in accordance with the rotation of the spool 4 to release the piston 10 of the clutch 2 from the back pressure of the pressurized oil.

In the control means for hydraulic clutches according to the present invention, which is constructed as mentioned above, the valve lever 5 is never rotated while the toggle spring 20 does not reach the center of the spool 4 after the shift lever 15 has begun to be rotated by operating the control handle 17; it is rotated by the resilient force of the toggle spring 20 when the spring has exceeded the center of the spool 4 to any extent. The change-over valve 3 is opened and closed via the spool 4 by the rotation of the valve lever 5. Namely, the change-over valve 3 can be opened and closed at a predetermined high speed at any time irrespective of the operation speed of the control handle 17. Therefore, the control means according to the present invention permits preventing the hydraulic clutch from being slipped to be put into a half-operated state. It also permits preventing an early wear on the lining and generation of unnecessary heat.

When the effective length $l_1$ of the shift lever 15 is greater than that $l_2$ of the valve lever 5 as shown in FIG. 2 so as to render the angle of rotation $\alpha$ of the shift lever 15 greater than that $\beta$ of the valve lever 5, the time of operation of the valve lever 5 may be shortened.

Incidentally, when a slide spool type change-over valve, in which a spool inserted in a sleeve is axially slidingly moved to open and close the oil passage, is used in the present invention, a push arm which can be rotated as it is always in contact with the tip of the spool may be provided, which arm has, for example, a link mechanism as shown in FIG. 2. pivotally connected to the tip thereof, to obtain the same effect.

The present invention is not, of course, limited to the above-described embodiments; it may be modified in various ways within the scope of the appended claims.

What is claimed is:

1. For use in combination with a hydraulic clutch and a valve means operatively connected to said clutch to control the flow of fluid pressure to said clutch for effecting the operation of said clutch between an operative engaged position and an inoperative disengaged position, the improvement of a control means for positively actuating said clutch between operative and inoperative positions in a manner which prohibits clutch slippage and with a minimum of delay in the transition interval of shifting of said clutch between operative and inoperative position, said control means including a valve lever connected to said valve means, a shift lever; means pivotally connecting to said shift lever to said valve lever whereby said shift lever pivots relative to said valve lever; a spring means interconnecting to and between the opposed ends of said respective shift lever and valve lever; a control handle, and linkage means interconnected between said control handle and said shift lever whereby said shift lever is rendered responsive to the actuation of said control lever, and said valve lever being activated only when said shift lever pivots relative to the valve lever an amount sufficient to move said spring means through the axis of said pivot means.

2. The invention as defined in claim 1, wherein the length of the shift lever is greater than the length of the valve lever.

3. The invention as defined in claim 1, wherein said valve means includes a movable valve member, said valve lever being connected to said valve member, and whereby the length of said shift lever is greater than the length of said valve member.

4. The invention as defined in claim 3 and including means for limiting the movement of each said lever toward both the operative and inoperative positions.

5. The invention as defined in claim 2 wherein said valve means includes a valve member, a valve lever having one end connected to said valve member, a shift lever, means for pivotally connecting one end of said shift lever to said one end of said valve lever whereby said shift lever is free to pivot relative to said valve lever; anchor means connected intermediate to the ends of each of said levers, said spring means including a coil spring having its respective end portions connected to the anchor means of each said levers.

6. The invention as defined in claim 5 wherein the distance between said pivot means and said shift lever anchor means is greater than the distance between said pivot means and said valve lever anchor means.

* * * * *